Oct. 7, 1941.   D. HEYER   2,257,744
VARIABLE SPEED TRANSMISSION DEVICE
Filed Sept. 2, 1932   4 Sheets—Sheet 1
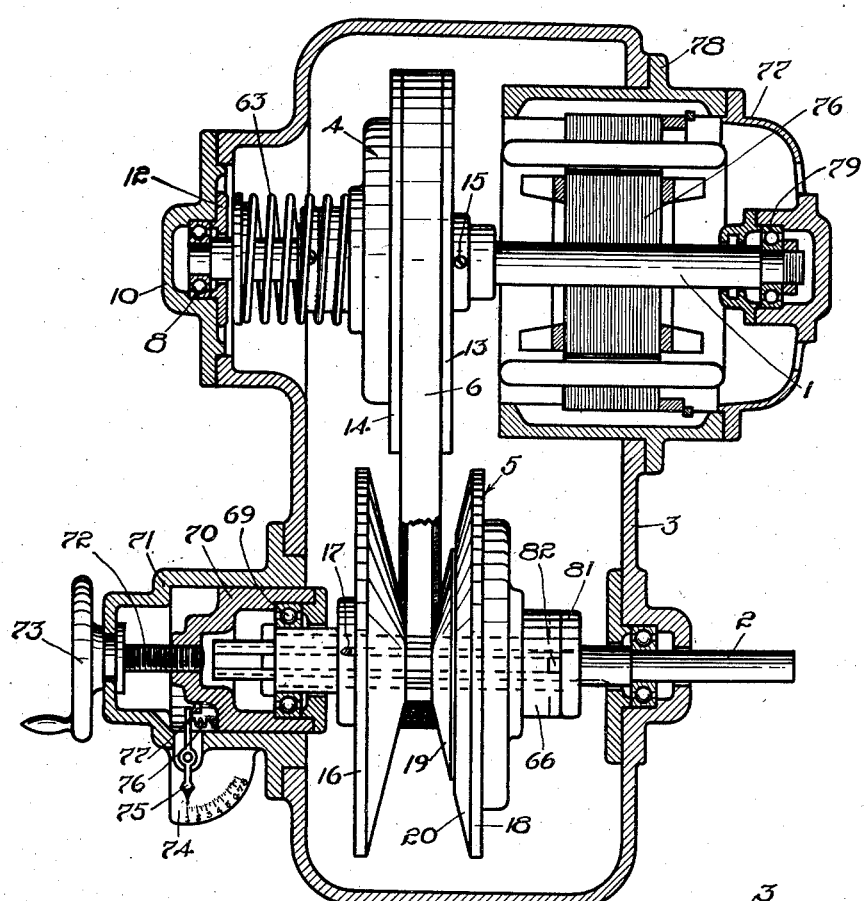
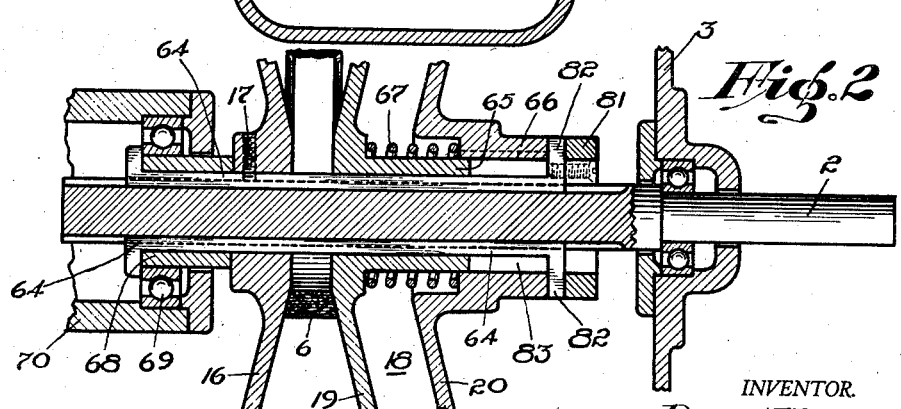
INVENTOR.
Don Heyer
BY
John Flam
ATTORNEYS.

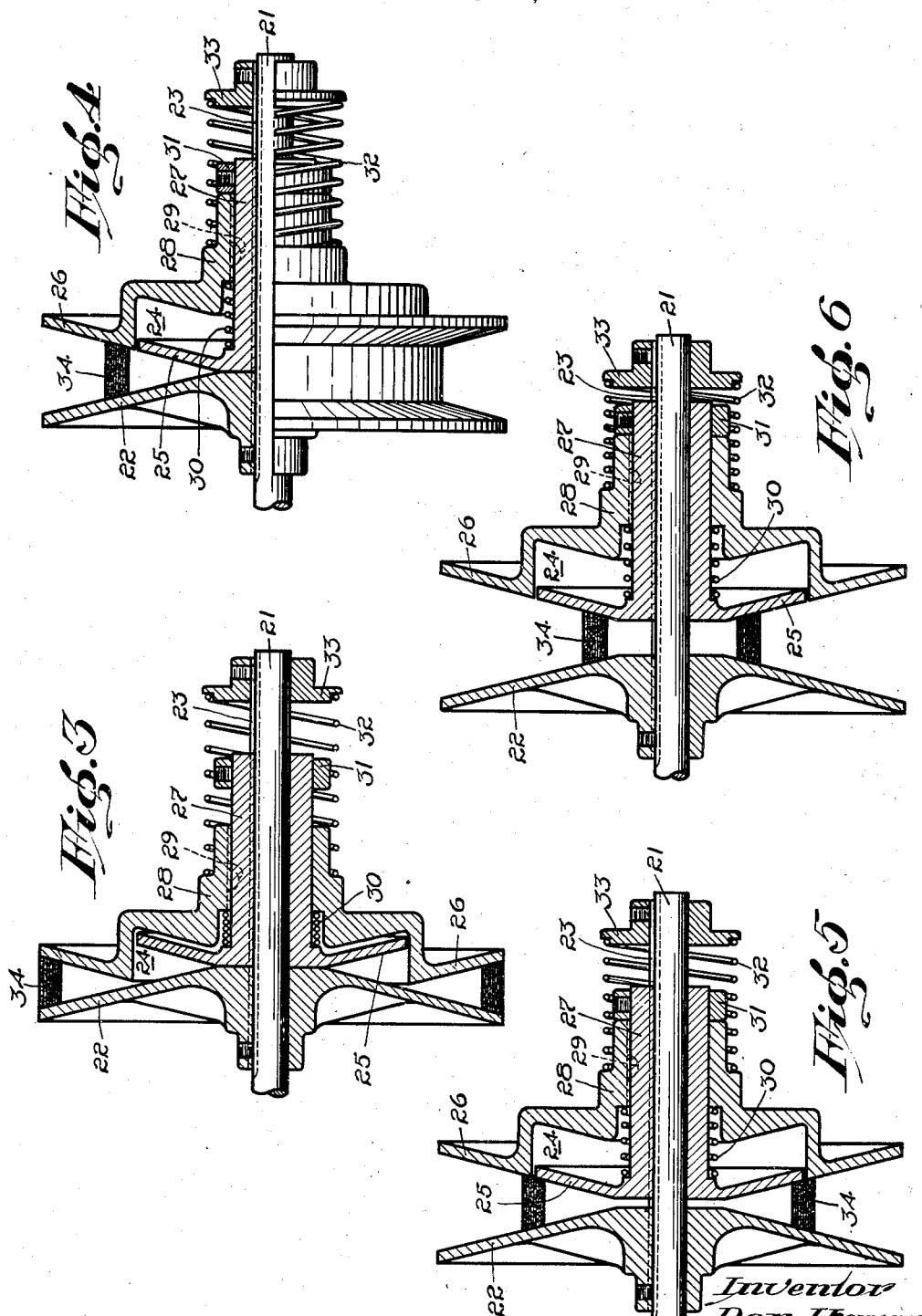

Oct. 7, 1941.     D. HEYER     2,257,744
VARIABLE SPEED TRANSMISSION DEVICE
Filed Sept. 2, 1932     4 Sheets-Sheet 3
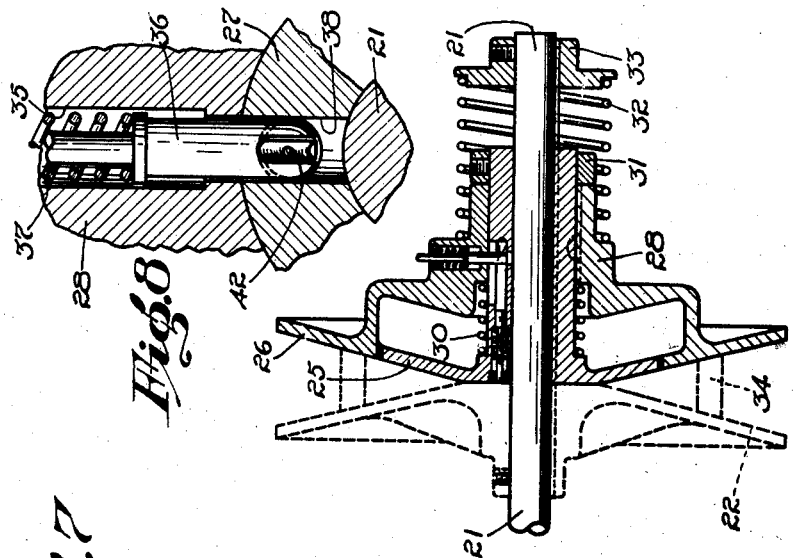
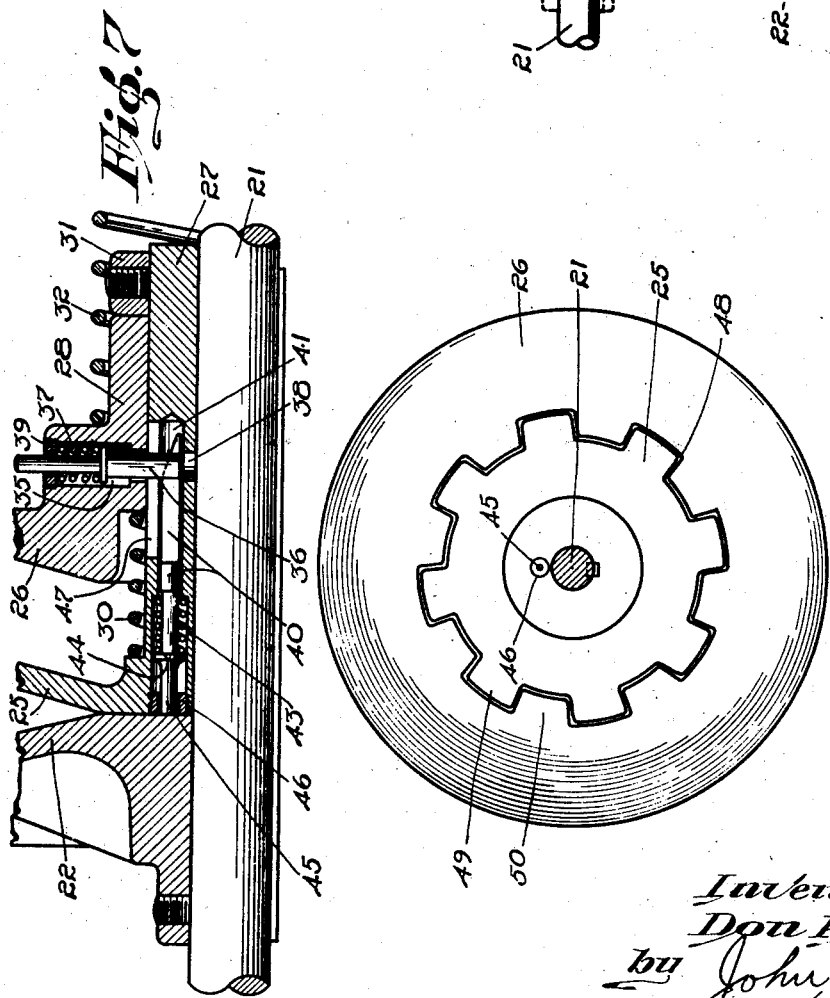

Oct. 7, 1941.   D. HEYER   2,257,744
VARIABLE SPEED TRANSMISSION DEVICE
Filed Sept. 2, 1932   4 Sheets-Sheet 4
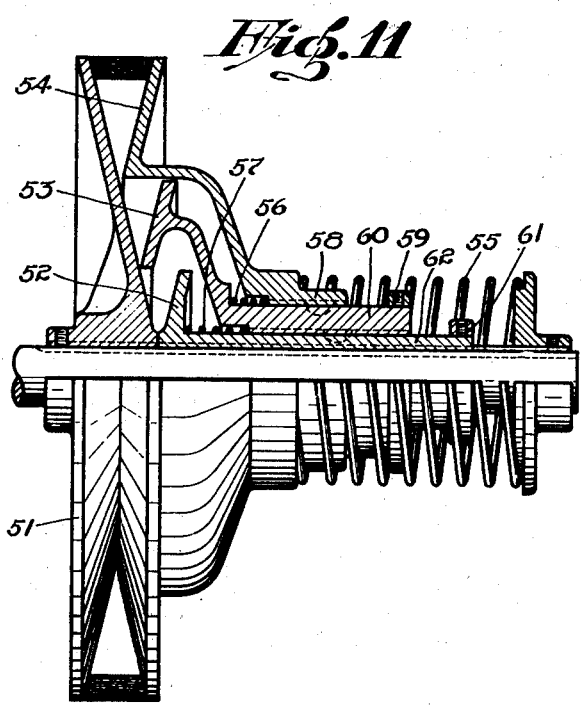

Patented Oct. 7, 1941

2,257,744

UNITED STATES PATENT OFFICE 2,257,744

VARIABLE SPEED TRANSMISSION DEVICE

Don Heyer, Los Angeles, Calif., assignor to U. S. Electrical Motors, Inc., a corporation of California Application September 2, 1932, Serial No. 631,533

25 Claims. (Cl. 74—230.17)

This invention relates to a device for transmitting power through an adjustable speed mechanism. More particularly, it relates to pulley and belt constructions in which at least one of the pulley structures has an adjustable effective diameter.

This adjustment is usually effected by making the pulley structure of two sections, which have sloping faces opposed to each other. The sections are adjustable axially toward and from each other. When at their extreme separation, the belt is allowed to enter between the two faces at a place that is at a comparatively short radial distance from the axis, whereby a small or minimum effective diameter is provided. As the two sections approach each other, this effective diameter is increased, the belt riding radially outwardly between the faces.

Such an arrangement is now well-known. However, there are disadvantages appertaining to that structure, which it is the aim of the present invention to obviate. Thus, in order to make possible a sufficiently large variation of pulley diameters, it has been necessary in the past to do either one of two things. One way is to provide a wide belt, so that when the belt is at its maximum radial distance from the axis of the pulley (maximum effective diameter), the inwardly inclined faces of the pulley sections do not interfere with each other at the hub. This is a serious disadvantage, since such a wide belt is wasteful of space, and is furthermore weak in a lateral direction, increasing the possibility of buckling the belt about a longitudinal center.

The other alternative is to permit the two sections to interlace near their hubs, as by providing slots in the inclined faces of each of the sections, into which corresponding teeth of the other section may enter. This is disadvantageous, because when the effective pulley diameter is small, the slots provide spaces reducing the area of contact between the belt and the pulley. It is therefore impossible to transmit as much power as otherwise, due to the danger of slippage on the reduced contacting surfaces.

It is one of the objects of this invention to make it possible to vary the effective pulley diameter within wide limits, without the necessity of using wide belts, or interlaced pulley structures.

It is another object of this invention to provide a compact and simple mechanism for varying the ratio of power transmission, as well as to indicate that ratio.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a sectional view of a variable ratio power transmission mechanism embodying the invention;

Fig. 2 is an enlarged detail sectional view thereof;

Figs 3, 4, 5, and 6 are detail views showing a pulley structure embodying the invention, in various stages of adjustment for effective pulley diameters;

Fig. 7 is an enlarged detail section of a modified form of pulley structure;

Fig. 8 is a transverse section of a detail thereof;

Fig. 9 is a face view of a pulley section incorporating the invention;

Fig. 10 is a longitudinal section of one pulley section built in accordance with Fig. 9; and Fig. 11 is a quarter-sectional view of another modified form of pulley structure embodying my invention.

In Figs. 1 and 2, a casing 3 is indicated, forming a cover for substantially all of the parts of the transmission mechanism. In the present instance, the transmission of power may be assumed to be from a shaft 1 to shaft 2, although the reverse arrangement is also possible. Shaft 2 can extend out of the casing to be coupled to a load; and shaft 1 is shown as carrying a rotor 76 of an electric motor 77, supported directly on casing 3.

Thus the frame of this motor can have a flange 78 fastened to the edge of a large opening in the casing. Since the motor structure can be conventional, further description thereof is considered unnecessary.

Shafts 1 and 2 are shown as parallel, the distance between their axes being in this instance fixed. The ratio of transmission is varied by the aid of variable diameter pulley structures 4 and 5, connected by a flexible V-belt 6. Shaft 1, which is the driving shaft, is shown as supported at one end in the motor bearing structure 79, and at the other end by the ball bearing structure 8. Bearing 8 has an outer race driven or forced into a recess or shoulder, in the cap 10. The inner races of these bearings are similarly driven against shoulders on the shaft 1. Retainer 12 may be used to hold the outer race firmly in its recess.

Pulley structure 4 has an effective diameter, which is varied by relative axial movement of the two pulley sections 13 and 14. Each of these sections has a sloping face, respectively opposed to each other, and corresponding to the cross section of belt 6. Since the pulley structure 4 is similar to structure 5, it is sufficient merely to note that right hand section 13 in this instance is fixed on shaft 1, as by set screw 15; and left hand section 14 is axially movable, but splined on shaft 1.

Similarly, pulley structure 5 includes a left hand section 16 fixed to shaft 2, as by set screw 17; and the right hand section 18 is axially movable toward and from section 16, but restrained against relative angular rotation. Due to the fact that the diagonally opposite sections 13 and 16 are axially fixed, while the other diagonally opposite sections 14 and 18 are axially movable, it is apparent that simultaneous movement of both sections 14 and 18 toward the left serves simultaneously to increase the effective diameter of pulley structure 5, and to decrease the effective diameter of pulley structure 4. This causes a decreased speed ratio from shaft 1 to shaft 2. On the other hand, simultaneous movement of both sections 14 and 18 toward the right serves simultaneously to decrease the effective diameter of pulley structure 5, and to increase the effective diameter of pulley structure 4. This causes an increase in speed ratio from shaft 1 to shaft 2. For the particular position shown in Fig. 1, the speed ratio is greatest, since pulley structure 5 has a minimum effective diameter, while pulley structure 4 has a maximum effective diameter.

It is also apparent that, due to the particular choice of axially movable and axially fixed pulley sections (that is, the pairs of diagonally opposite sections being respectively fixed and movable), the belt 6 is kept in proper alinement between the structures 4 and 5, although its position in an axial direction varies as the pulley structures are adjusted. Thus as the effective diameter of structure 5 increases, the belt 6 moves in an axial direction toward the left; and vice versa.

When either pulley structure 4 or 5 is at its minimum setting (as shown for example for structure 5 in Fig. 1), the inclined opposed faces of the corresponding pulley sections diverge in a radial direction; and the larger in diameter these sections are, the greater the divergence at the edges of the sections; and accordingly, the greater the axial movement must be to bring the outer edges of these sections together for a maximum effective diameter setting. Therefore, to make possible a large variation between minimum and maximum diameters, it has been essential, in prior constructions, to provide for this large axial adjustment adjacent the hubs of the pulley sections, by either an interlacing effect, or by providing a wide belt structure. As stated before, however, such expedients are either wasteful of space, or produce inefficiency in the transmission, or both.

In accordance with the present construction, the required large axial adjustment is provided for between the pulley sections at and near their peripheries, without the necessity of providing the same degree of adjustment at or near the hub portions. This effect is obtained by making at least one of the pulley sections, such as 14 or 18, out of a number of annular parts, or members such as an inner part 19, and an outer part 20. Therefore, even after the inner part 19 may be prevented from further axial movement toward section 16, the outer part 20 can still move toward the section 16 to increase the effective pulley diameter.

Since this feature of the invention may be readily incorporated in general in a large variety of variable V-belt pulleys, it has been shown more clearly in Figs. 3 to 6 inclusive, which illustrate a pulley structure in various stages of adjustment. A description of this structure will apply in general to pulley structures, such as 4 and 5 of Fig. 1, insofar as the telescopic nature of the annular parts is concerned.

In Figs. 3 to 6, there is shown a shaft 21, carrying, at the left, an axially fixed pulley section 22. Axially adjustable with respect to section 22, is a pulley section shown in general by reference character 24. To provide such axial adjustment without any relative angular movement, a key 23 is supported in shaft 21 and extends through both sections 22 and 24. This key acts as a spline for the axially adjustable section 24.

This section 24 comprises the inner annular member 25 and the outer annular member 26. As shown in Figs. 4, 5, and 6, these two members can provide in conjunction, a substantially continuous inclined face. However, provisions are made for relative axial movement between members 25 and 26, to permit the outer member 26 to continue to move toward section 22 even after the member 25 is prevented from such axial motion.

This can be accomplished for example, by providing member 25 with a long hub 27, directly splined on shaft 21. To this hub in turn is splined the hub 28 of the member 26, as by the Woodruff key 29. A resilient force is provided, which tends always to urge the two members 25, 26 into the alined position of Figs. 4, 5 or 6. Thus a spring 30 encompassing hub 27, can be inserted between opposed shoulders on the members 25, 26. A stop collar 31 is fastened to the right hand end of hub 27 to limit the axial movement of member 26 toward the right with respect to member 25.

The outer member 26 in this instance is intended to be acted upon by the force that adjusts the pulley diameter. This force can be an automatically impressed one, such as that provided by a compression spring 32 encompassing hub 28. It abuts against a shoulder on this hub, and its other end abuts against a spring anchor collar 33 fastened to shaft 21.

The action of spring 32 is to urge the entire section 24 toward the left until the inclined faces are forced to contact with opposite sides of a V-belt 34. This action is automatic, and is similar to the action of springs heretofore used in adjustable pulley structures in general. However, positive actuation of member 26 can be provided for, if desired. When belt 34 is at its minimum distance from the axis of shaft 21, as shown in Fig. 6, spring 30 may be expanded to urge hub 28 against collar 31, and both members 25, 26 are at their maximum distance from section 21. An increase in effective pulley diameter is automatically secured in response to a reverse change in diameter, of the pulley that is in power transfer relation to pulley 22—24. Such an increase, to an intermediate size, is illustrated in Fig. 5. Here hubs of members 22 and 25 are almost in contact, due to the movement of members 25, 26 toward the left. The belt 34 has moved outwardly to be in this instance, partially in contact with both members 25, 26.

In Fig. 4, the belt 34 has moved still further outwardly, and is now entirely off the inner member 25. The hubs of section 22 and of member 25 are in contact. Further increase in pulley diameter is nevertheless permitted, because spring 32 (or any positive force) can continue to urge section 26 toward the left, against the action of spring 30. Thus the peripheries of section 22 and member 26 can be brought close enough together, as shown in Fig. 3, to contact with belt 34 at its maximum distance from the axis. In this figure, member 26 has telescoped over member 25.

For decreasing pulley diameters the operation is the reverse of that described. It is essential, of course, when a spring is used for adjusting the pulley diameter, that the spring 32, which can normally overpower spring 30, be prevented from doing so until the hubs of the two sections are in contact. In other words, motion of both members 25 and 26 toward the left up to the position of Fig. 4 should be in unison; and from then on, member 26 should be permitted to telescope over member 25. One scheme for ensuring this result is shown in Figs. 7, 8, 9 and 10.

Hub 28 is shown as provided with a radial recess 35 (Figs. 7, 8, and 9), in which extends a plunger 36. This plunger is urged, as by spring 37, radially inwardly to engage an aperture 38 in hub 27 thereby locking the two members 25, 26 together. Spring 37 is held in compression by the aid of a threaded cover 39 for aperture 35. The locked position is such as to aline the sloping faces of the members 25, 26.

The arrangement is such, however, that plunger 36 is withdrawn from locking position just as soon as member 25 contacts with member 22, so that then member 25 can be urged still further to the left. This unlocking device includes a bar 40 of rectangular section, sliding in a recess 41 in hub 27. Its right hand end is sloping and is accommodated in a slot 42 in the bottom of the plunger 36. Normally, a compression spring 43 acts to move bar 40 toward the left, so that its sloping end is withdrawn almost entirely from slot 42, permitting plunger 36 to enter aperture 38. This compression spring acts against a shoulder on bar 40, formed by flange 44. An extension 45 of bar 40 is slidable in a guide 46 in the front of the recess 41, and projects outwardly as far as permitted by collar 44, which then engages the inner face of guide 46.

For this position, bar 40 is urged toward the left, permitting plunger 36 to lock the members 25, 26 together. However, just as soon as the member 25 contacts with section 22, as illustrated in Figs. 7 and 10, bar 40 is urged toward the right with respect to plunger 36, lifting it to unlocking position. Then, due to the provision of slot 47 that communicates with recess 41, through which plunger 36 extends, member 26 can continue to move toward the left to increase the effective diameter still further. Movement of member 26 from the extreme left hand position of Fig. 3, to decrease the effective diameter, results in the sliding of plunger 36 over bar 40. When the members 25, 26 have their inclined faces alined, the plunger 36 is immediately above aperture 38, and ready to lock just as soon as bar 40 is retracted by spring 43.

As shown most clearly in Fig. 9, the split 48 between the members 25, 26 can be non-circular, and can provide interengaging or overlapping surfaces 49, 50. In this way, when belt 34 overlies this split, there is no tendency to wear a groove in the belt, as might be the case if split 48 were circular. Split 48 is shown exaggerated in width.

It is possible of course to provide more than two telescoping members to form one of the pulley sections. Such an arrangement is especially useful for extremely large variations in pulley diameter. A three element device of this character is diagrammatically illustrated in Fig. 11. Here axially fixed section 51 is shown as cooperating with members 52, 53, 54 which comprise the axially movable section. Each of the members 52, 53, 54 are relatively slidable in telescopic relation. A compression spring 55 is here shown as supplying a resilient adjusting force, acting on the outermost section 54. Springs 56, 57 are the equivalent of spring 30 in the form previously described.

It is apparent in this form that, from the maximum setting shown, first member 54 is moved toward the right, to reduce the effective diameter. This continues until hub 58 contacts with stop collar 59 on hub 60. Further right hand motion causes both sections 54 and 53 to move together. When hub 60 contacts with stop collar 61 on hub 62, further movement causes all members 52, 53, 54 to move out in unison. Locks may be provided between the sections, similar to that disclosed in Figs. 7 and 8.

Having now described the essential details of such adjustable pulley structures as 4 and 5 of Fig. 1, the description of the system shown in that figure can proceed. Structure 4 utilizes a yielding force, such as spring 63, to adjust the axially adjustable section 14, automatically in accordance with the requirements imposed thereon by the positive adjustment of section 18. The manner in which section 18 is positively adjusted will now be described.

A number of splines 64 are slidable in keyways in shaft 2. These splines all extend through both the axially immovable section 16 and through the hub 65 of the inner member 19. This member 19 is axially slidable on the splines. The splines, however, are mechanically joined at their right hand end to hub 66 of outer member 20. This is accomplished by the aid of a collar 81 fastened to the end of hub 66 and holding the spline ends 82 in slots formed in hub 66. Hub 65 is also slotted as at 83 to permit the splines 64 to move inwardly with respect to hub 65.

For the setting at minimum effective diameter as shown in Fig. 2, sections 19, 20 are locked together by the lock mechanism shown in Figs. 7 and 8; accordingly, if splines 64 are moved to the left in the keyways, both members 19, 20 will move in unison. This can occur only until member 19 contacts with section 16; then, the members 19, 20 are unlocked, and further movement of splines 64 causes member 20 to move to the left to increase the pulley diameter. At the same time, spring 67 between members 19, 20 is compressed.

It is possible to move splines 64 in the grooves from either side of casing 3. It is preferred, however, to accomplish this from that side which is remote from the shaft extension to which the load is connected. Thus a collar 68 is fastened to the splines and is slidable on shaft 2. Upon this collar is fastened the inner race of a ball bearing 69. The outer race is fastened in a shoulder in a cylinder 70 which is axially adjustable in a guide 71. Bearing 69 acts both as a thrust bearing for collar 68 and the associated splines 64, as well as a bearing support for the left hand end of shaft 2.

It is apparent that axial adjustment of cylinder 70 will axially adjust the section 18. This can be done by a screw 72 rotated as by hand wheel 73, and journalled in the end wall of guide 71. This screw engages a tapped hole in the end of cylinder 70, which is prevented, by appropriate means, from angular rotation in guide 71. The extreme right hand position of adjustment of splines 64 and section 18 is illustrated, collar 68 being close to the hub of axially immovable section 16.

A convenient means for indicating the ratio of speed transmission is provided by a scale 74 and pivoted pointer 75. This pointer is urged toward its left hand position by a spring 76, but is moved away therefrom by a projection 77 fastened to the cylinder 70. As cylinder 70 is moved farther and farther toward the left, pointer 75 is correspondingly moved over scale 74 in a counterclockwise direction, and indicates the particular speed ratio corresponding to the axial adjustment of splines 64 and pulley section 18.

I claim:
1. In a variable speed pulley structure having a shaft, a pair of relatively adjustable sections on said shaft, with opposed inclined faces, forming by adjustment, variable effective pulley diameters, one of said sections being axially fixed to the shaft, the combination therewith of means for axially adjusting the other section, said means comprising a slidable member extending through the axially fixed section and connected to the other section, and a bearing support for the shaft mounted on said slidable member on the opposite side of the fixed section with respect to the adjustable section.

2. In a variable speed pulley structure having a shaft, a pair of relatively adjustable sections on said shaft, with opposed inclined faces, forming by adjustment, variable effective pulley diameters, one of said sections being axially fixed to the shaft, the combination therewith of means for axially adjusting the other section, said means comprising a member slidable on the shaft, and extending through the axially fixed section and connected to the other section, and a thread and screw mechanism for moving said slidable member.

3. In a variable speed pulley structure having a shaft, a pair of relatively adjustable sections on said shaft, with opposed inclined faces, forming by adjustment, variable effective pulley diameters, one of said sections being axially fixed to the shaft, the combination therewith of means for axially adjusting the other section, said means comprising a slidable member extending through the axially fixed section and connected to the other section, means providing a bearing support for the slidable member and the shaft, and a thread and screw mechanism for moving said support providing means.

4. A variable speed pulley structure having a pair of relatively adjustable sections with opposed inclined faces forming by adjustment, variable effective pulley diameters, a belt engaging said sections, one of said sections comprising a plurality of relatively axially movable members of annular form, the faces of which can cooperate to form a substantially coextensive inclined face, the boundaries between the members being in the form of two interrupted circles of different diameters forming dovetailed teeth, said circles being spaced far enough apart to prevent simultaneous contact of the belt with more than one of the circular boundaries.

5. A variable speed pulley structure having a pair of relatively adjustable sections with opposed inclined faces forming by adjustment, variable effective pulley diameters, one of said sections comprising a plurality of relatively axially movable members of annular form, the faces of which can cooperate to form a substantially coextensive inclined face, means for locking said members together against relative axial movement so as to form said coextensive inclined face, and means actuated by movement of the locked members toward the other section and by contact with the face of said other section, to unlock the members.

6. A variable speed pulley structure having a pair of relatively adjustable sections with opposed inclined faces forming by adjustment, variable effective pulley diameters, one of said sections comprising a plurality of relatively axially movable members of annular form, the faces of which can cooperate to form a substantially coextensive inclined face, means for locking said members together against relative axial movement so as to form said coextensive inclined face, and an axially extending member adapted to project beyond the face of the inner annular member for unlocking the members by contact with a surface of the other section as the sections move toward each other.

7. A variable speed pulley structure having a pair of relatively adjustable sections with opposed inclined faces forming by adjustment, variable effective pulley diameters, one of said sections comprising a plurality of relatively axially movable members of annular form, the faces of which can cooperate to form a substantially coextensive inclined face, a radial bolt for locking said members together against relative axial movement so as to form said coextensive inclined face, and a rod having its axis parallel with the pulley axis and having a cam surface cooperating with the bolt to release it and moved toward releasing position by contact with a surface of the other section.

8. A variable speed pulley structure having a pair of relatively adjustable sections with opposed inclined faces forming by adjustment, variable effective pulley diameters, one of said sections comprising a plurality of relatively axially movable members of annular form, the faces of which can cooperate to form a substantially coextensive inclined face, a radial bolt for locking said members together against relative axial movement so as to form said coextensive inclined face, means acting to move the bolt radially to locking position when said members form said coextensive face, means for moving said bolt to unlocking position, and resilient means urging said unlocking means to inactive position.

9. A variable speed pulley structure having a pair of relatively adjustable sections with opposed inclined faces forming by adjustment, variable effective pulley diameters, one of said sections comprising a plurality of relatively axially movable members of annular form, the faces of which can cooperate to form a substantially coextensive inclined face, a radial bolt for locking said members together against relative axial movement so as to form said coextensive inclined face, means acting to move the bolt radially to locking position when said members form said coextensive face, unlocking means for moving said bolt to unlocking position, and resilient means urging said unlocking means to inactive position, said unlocking means for moving said bolt to unlocking position being carried by the inner of the two members and urged in a direction parallel with the pulley axis to unlock the bolt upon definite relative movement of the sections toward each other.

10. In a variable speed pulley structure having a shaft, a pair of relatively adjustable sections on said shaft, with opposed inclined faces forming variable effective pulley diameters, one of said sections being axially fixed to the shaft, a member extending through the axially fixed section and axially slidable on the shaft, said member being connected to the other section, a coaxial bearing support on said slidable member on the side thereof remote from the adjustable section, and an axially movable thrust bearing structure cooperating with said support to adjust the spacing between the sections.

11. In a variable speed pulley structure having a shaft, a pair of relatively adjustable sections on said shaft, with opposed inclined faces forming variable effective pulley diameters, one of said sections being axially fixed to the shaft, a spline slidable in a keyway in the shaft and in a keyway in the axially fixed section and extending through said axially fixed section, means for attaching said spline to the axially movable section, a collar fixed to the spline near that end which is remote from the movable section, and an axially movable thrust bearing for said collar.

12. In an enclosed variable speed power unit including, a shaft, an adjustable pulley structure mounted on said shaft, said adjustable pulley structure including a pair of relatively axially movable pulley sections having opposed inclined belt engaging faces, forming by relative axial adjustment, variable effective pulley diameters, and a casing enclosing said pulley structure; the combination therewith of, a removable cover for said casing, having an extension, a member slidable in said extension for adjusting the axial position of one of said pulley sections, and a speed indicating means supported by said cover and actuated in response to the movement of said member.

13. In an enclosed electrically driven variable speed power unit, a driving shaft and a driven shaft, a pair of adjustable pulley structures in respective axial driving relation to each of said shafts, each of said pulley structures including a pair of pulley sections having opposed inclined belt engaging faces, a belt in active driving relation to said pulley structures, a casing having walls enclosing said belt and pulley structures, a bearing for the driving shaft supported on one wall of the casing, a load driving means projecting outside of said casing, an electric motor including a stator and a rotor, said rotor being in axial driving relation to said driving shaft, said motor having a bearing adjacent that end of the motor remote from the associated pulley structure, and means supporting said stator by one wall of said casing whereby said stator projects into said casing beyond the wall of said casing adjacent said stator, said driving shaft bearing and said motor bearing serving as substantially the sole means for rotatably supporting the driving shaft, rotor and associated pulley structure.

14. An expanding pulley for variable speed transmission, comprising a pair of pulley sections having opposed tapered belt-engaging faces, one of said pulley sections being fixed, the other of said pulley sections comprising a plurality of nested concentric parts laterally shiftable, in unison and in combination, said concentric parts being shiftable to and from said fixed pulley sections and locking pins carried by certain concentric parts for interlocking said parts to adjacent concentric parts in certain positions.

15. In an adjustable speed power unit, a shaft, an adjustable pulley structure in axial driving relation to said shaft, said adjustable pulley structure including a pair of pulley sections having opposed inclined belt engaging faces forming by relative axial adjustment variable effective pulley diameters, a stationary support, a screw coaxial with the shaft and spaced axially therefrom, and supported on the support, and mechanism axially moved by the screw and joined to one of the pulley sections, for adjusting the pulley structure.

16. In an adjustable speed power unit, a shaft, an adjustable pulley structure in axial driving relation to said shaft, said adjustable pulley structure including a pair of relatively axially movable pulley sections having opposed inclined belt engaging faces, forming by relative axial adjustment variable effective pulley diameters, means connected to one of said sections and extending through and beyond the other section, a bearing structure mounted on said means, means for supporting said bearing structure, and means for axially moving said bearing structure, said bearing structure serving to move the associated section as well as to support the shaft.

17. In an adjustable speed power unit, a driving shaft, a driven shaft, a pair of pulley structures in respective driving relation to said shafts, a belt connecting said structures, one of said structures including a pair of pulley sections having opposed inclined belt engaging faces forming by relative axial adjustment variable effective pulley diameters, a casing enclosing said pulley structures, a rotatable screw coaxial with said sections and arranged to be operated from the exterior of the casing, for axially adjusting one of said sections, and a member axially advanced by the screw and joined to the adjusted pulley section, said screw and member forming a coaxial structure supported substantially entirely by the casing out of direct contact with the shaft.

18. In an adjustable speed power unit, a driving shaft, a driven shaft, a pair of pulley structures in respective driving relation to said shafts, a belt connecting said structures, one of said structures including a pair of relatively axially movable pulley sections having opposed inclined belt engaging faces, forming by relative axial adjustment variable effective pulley diameters, a casing enclosing said pulley structures, means forming an extension from the casing, a member supported in said extension coaxially to the sections, and joined to one of the sections, and coaxially rotatable means manipulatable externally of the casing for moving said member axially.

19. In an adjustable speed power unit, a shaft, an adjustable pulley structure in axial driving relation to said shaft, said adjustable pulley structure including a pair of relatively axially movable pulley sections having opposed inclined belt engaging faces, forming by relative axial adjustment variable effective pulley diameters, a stationary support, a hollow extension on the support, an axially movable member guided in said extension and operating to move one of said sections, means for moving said member, and an indicator having a pivotally mounted pointer a part of the pointer extending into the extension and mechanically operated by the axially movable member.

20. In a variable speed power unit including a shaft, an adjustable pulley structure mounted on said shaft, said adjustable pulley structure including a pair of relatively axially movable pulley sections having opposed inclined belt engaging faces, forming by relative axial adjustment, variable effective pulley diameters; the combination therewith of a casing enclosing said pulley structure and having an aperture, a cover for the aperture, a member movable in an axial direction with respect to the shaft for adjusting the pulley sections, and supported by said cover, and a rotatable adjusting means coaxial with the shaft and also supported on the cover for exterior manipulation for operating said member.

21. In a variable speed power unit including a shaft, an adjustable pulley structure mounted on said shaft, said adjustable pulley structure including a pair of relatively axially movable pulley sections having opposed inclined belt engaging faces, forming by relative axial adjustment, variable effective pulley diameters; the combination therewith of a casing enclosing said pulley structure, a member for adjusting the pulley sections, rotatable means exterior of the casing and coaxial with the shaft, said means being fixed against axial movement with respect to the casing, for operating said member, and an indicator operated by said means and supported exteriorly of the casing.

22. In a variable speed power unit including a shaft, an adjustable pulley structure mounted on said shaft, said adjustable pulley structure including a pair of relatively axially movable pulley sections having opposed inclined belt engaging faces, forming by relative axial adjustment, variable effective pulley diameters; the combination therewith of a casing enclosing said pulley structure and having an aperture, a cover for the aperture including a guide, an axially adjustable member in telescopic relationship with said guide and coaxial with the shaft, bearing means interposed between said adjustable pulley section and said adjustable member, means supported on the cover and operable from outside the casing for axially adjusting the member, and an indicator supported by the cover to indicate the position of the member with respect to the cover.

23. In a variable speed power unit including a shaft, an adjustable pulley structure mounted on said shaft, said adjustable pulley structure including a pair of relatively axially movable pulley sections having opposed inclined belt engaging faces, forming by relative axial adjustment, variable effective pulley diameters; the combination therewith of a casing enclosing said pulley structure and having an aperture, a cover for said aperture having an extension, an adjustable member slidable in as well as supported and guided by said extension, a bearing mounted on said adjustable member and engaging said adjustable pulley section, threaded means carried by said cover adapted to adjust the position of said member with respect to the cover, said means being manipulatable from outside the casing.

24. In a variable speed power unit including a shaft, an adjustable pulley structure mounted on said shaft, said adjustable pulley structure including a pair of relatively axially movable pulley sections having opposed inclined belt engaging faces, forming by relative axial adjustment, variable effective pulley diameters; the combination of a casing enclosing said pulley structure and having an aperture, a cover for said aperture provided with a screw thread coaxial with said shaft, means engaging the screw thread and manipulatable from outside the casing, a member arranged to be advanced by movement of said means, and a thrust bearing interposed between said member and said adjustable pulley section.

25. In a variable speed pulley structure having a shaft, a pair of relatively axially movable pulley sections on said shaft having opposed inclined faces, forming by relative axial adjustment, variable effective pulley diameters, one of said sections being axially fixed to the shaft, bearing supporting means connected to the other of said sections, a bearing structure mounted on said means, and means for supporting and axially moving said bearing structure, said bearing structure serving to move the associated section as well as to support the shaft.

DON HEYER.